J. Osborn,
Sash Holder.
N° 8,135.   Patented June 3, 1851.
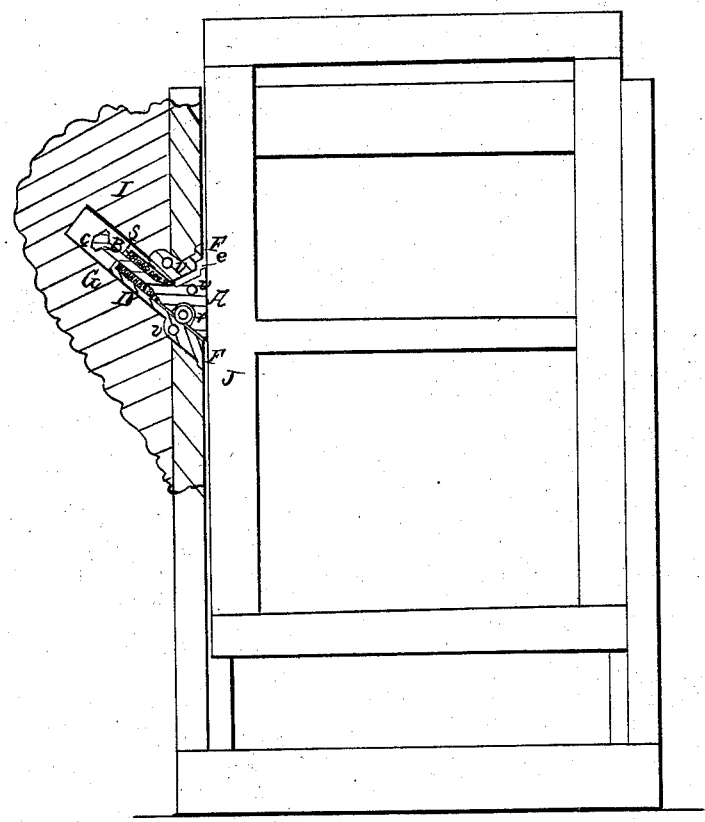
Fig. 2
Fig. 1
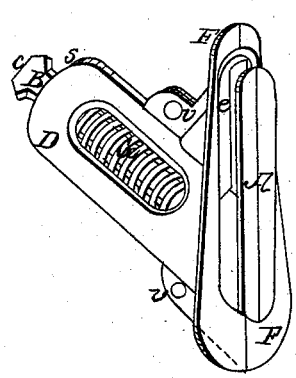
Fig. 3
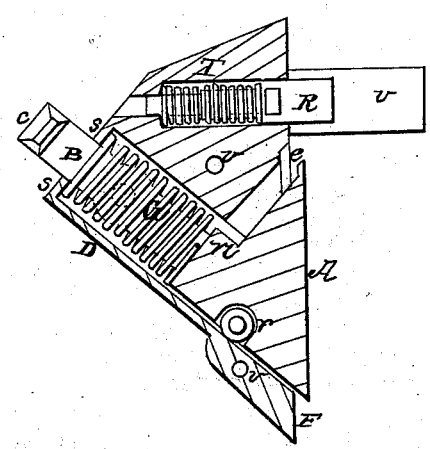

UNITED STATES PATENT OFFICE.

J. OSBORN, OF WEYMOUTH, MASSACHUSETTS.

SASH-STOPPER.

Specification of Letters Patent No. 8,135, dated June 3, 1851.

*To all whom it may concern:*

Be it known that I, JOSEPH OSBORN, of Weymouth, in the county of Norfolk and State of Massachusetts, have invented a new and useful Improvement in Sash-Stoppers; and I do hereby declare that the following is a full and exact description of the same, reference being had to the annexed drawings, making part of this specification, in which—

Figure 1 is a perspective view, and Fig. 2 is a longitudinal section of the apparatus, and of part of a window frame to which it is attached, and of a sash to which is applied; Fig. 3 is a longitudinal section through the apparatus, showing the attachment of a bolt.

The nature of this invention consists in so arranging and adjusting a friction plate and spring, that the plate shall present two or three times as much frictional resistance to the motion of a sash downward as to its motion upward.

An oblong metallic friction plate A has a flat oblique shank or bolt B about two inches long, and terminating at its upper end, in a flanched head $c$. This oblique bolt is incased in an oblique cylindrical socket D, the right or lower end of which terminates in an oblong vertical face plate F, in the face of which is a cavity $e$ of sufficient size and depth to receive the friction plate, so that the plane of each may be on the same line. The caliber of the socket is large enough to admit a helical spring G between the socket and the bolt B; but the left or upper end of the socket, is closed by a disk-head $s$ with the exception of a central orifice through which the bolt passes. On the left of the friction plate is a shoulder $n$ which presses against the right end of the helical spring, while the left end of the spring presses against the disk-head $s$ at the left end of the socket; so that the tendency of the spring is to press the friction plate obliquely downward to the right, while the flanch head $c$ by coming in contact with the head of the socket, limits the extent of the movement of the bolt B. This bolt is furnished with a small anti-friction pulley $r$, the periphery of which bears upon the lower side of the interior of the socket, that the bolt may move the more freely therein.

The friction plate with its bolt, and the face-plate with its socket, are each made in two longitudinal halves, and the two parts of each are connected by screws or rivets $v$ $v$. When this invention is to be applied, a hole is cut in the left side of the window frame, (I Fig. 2) and the socket being inserted therein, the face-plate is secured to the frame by screw; and the friction plate being pressed to the left, the sash (J) is adjusted in its proper position, so that the friction-plate is made to press against the adjacent side of the sash. When force is applied to raise the sash, so much of said force as encounters the frictional resistance of the plate, tends to counteract the force of the spring, and thereby relieves the sash from the friction of the plate; but when the gravity of the sash, or other force tends to force the sash downward, the ordinary friction of the friction-plate aids the force of the spring, and thus increases the frictional resistance. This sash-stopper may be attached to either side of the window frame, as circumstances may require. There may be used in connection with the sash stopper a horizontal hole R, situated in the upper portion of the face plate E, and provided with a helical spring T, and also a handle V, which projects therefrom on the inside of the sash as shown in Fig. 3.

What I claim as my invention and desire to secure by Letters Patent is—

Arranging a sash-stopper composed of a friction plate, bolt, and helical spring, with the friction plate parallel to the side of the sash and the bolt rising obliquely upward therefrom in the manner herein set forth, so that the upward motion of the sash will relieve the same from the frictional resistance of the friction plate by counteracting the force of said spring; and that the downward motion or tendency of the sash will augment the frictional resistance of said friction plate, by aiding the force of said spring.

In testimony whereof I have hereunto signed my name before two subscribing witnesses.

JOSEPH OSBORN.

Witnesses:
CYRUS WASHBURN,
ALVAH RAYMOND.